(12) United States Patent (10) Patent No.: US 8,875,674 B2
Yan (45) Date of Patent: Nov. 4, 2014

(54) DIFFERENTIAL-STROKE INTERNAL COMBUSTION ENGINE

(75) Inventor: Miin Jeng Yan, Dublin, OH (US)

(73) Assignee: Yan Engines, Inc., Austin, TX (US)

( * ) Notice: Subject to any disclaimer, the term of this patent is extended or adjusted under 35 U.S.C. 154(b) by 120 days.

(21) Appl. No.: 13/637,646

(22) PCT Filed: Mar. 30, 2011

(86) PCT No.: PCT/US2011/030594
§ 371 (c)(1),
(2), (4) Date: Sep. 26, 2012

(87) PCT Pub. No.: WO2011/123571
PCT Pub. Date: Oct. 6, 2011

(65) Prior Publication Data
US 2013/0014713 A1 Jan. 17, 2013

Related U.S. Application Data

(60) Provisional application No. 61/319,754, filed on Mar. 31, 2010.

(51) Int. Cl.
*F02B 75/04* (2006.01)
*F02B 75/32* (2006.01)
*F02B 41/04* (2006.01)
*F02B 75/28* (2006.01)

(52) U.S. Cl.
CPC .................. *F02B 75/28* (2013.01); *F02B 75/32* (2013.01); *F02B 41/04* (2013.01); *F02B 75/04* (2013.01); *Y02T 10/14* (2013.01)
USPC .................. 123/78 E; 123/78 BA; 123/193.4; 123/193.6; 123/197.1; 123/197.4

(58) Field of Classification Search
CPC ............................. F02G 2270/40; F02B 75/32
USPC .......... 123/78 E, 197.1, 197.4, 78 BA, 193.1, 123/193.6, 193.4
See application file for complete search history.

(56) References Cited

U.S. PATENT DOCUMENTS 857,410 A 6/1907 Morey
1,413,541 A * 4/1922 Reed .............................. 123/77

(Continued)

FOREIGN PATENT DOCUMENTS

DE 29613109 11/1997

OTHER PUBLICATIONS

International search report and written opinion dated May 26, 2011 for PCT/US2011/030594.

(Continued)

*Primary Examiner* — Lindsay Low
*Assistant Examiner* — Tea Holbrook
(74) *Attorney, Agent, or Firm* — Lloyd L. Davis; Andrews Kurth LLP

(57) ABSTRACT

An apparatus and method for a differential stroke combustion engine. The combustion engine including one or more two-part pistons, each two-part piston having a first piston part and a second piston part. The apparatus comprising: piston-lever element mechanically coupled to the second piston part; a plurality of cam-followers assemblies selectively coupleable with the piston-lever element for controlling operation of the second piston part; and wherein selective engagement of one or more cam-followers assemblies defines an operational mode of the second piston part.

20 Claims, 5 Drawing Sheets

(56) References Cited

U.S. PATENT DOCUMENTS

| | | | |
|---|---|---|---|
| 1,582,890 A * | 5/1926 | Ashley et al. | 464/114 |
| 2,822,791 A | 2/1958 | Biermann | |
| 4,516,539 A * | 5/1985 | Andreen | 123/51 B |
| 5,243,938 A * | 9/1993 | Yan | 123/197.1 |
| 6,234,138 B1 * | 5/2001 | Cathey | 123/197.4 |
| 8,397,684 B2 * | 3/2013 | Yang et al. | 123/48 R |
| 2002/0092495 A1 * | 7/2002 | Chen | 123/197.1 |

OTHER PUBLICATIONS

European Supplemental Search Report of corresponding counterpart European application No. 11763395.8 dated Aug. 19, 2013.

* cited by examiner

US 8,875,674 B2

DIFFERENTIAL-STROKE INTERNAL COMBUSTION ENGINE

FIELD OF THE INVENTION

The present invention relates to combustion engines and in particular to differential-stroke internal combustion engines.

The invention has been developed primarily for use as a piston apparatus for a differential-stroke internal combustion engine, and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Conventional internal combustion engines have at least one cylinder, a piston in the cylinder, and a crankshaft driven by the piston. Most of these engines operate on a four stroke cycle of the piston per two revolutions of the crankshaft. During the cycle, the piston's strokes are first outward for intake, first inward for compression, second outward (after ignition) for combustion and power, and second inward for exhaust. The burnt gas is driven out during the exhaust stroke and a fresh charge is drawn in during the intake stroke. These two strokes require little force and the piston is subject to no or low pressures. These two strokes also require one entire revolution of the crankshaft for these purposes.

More output could be obtained from a four stroke engine of a given displacement if it could complete its cycle in only one revolution of the crankshaft. There are conventional two-stroke engines in which the four functions of combustion, exhaust, intake and compression, are crammed into two strokes of the piston per one revolution of the crankshaft. Such two-stroke engines generally weigh less than four-stroke engines but are generally less fuel efficient than four-stroke engines, and hence are conventionally used only in certain special fields, such as small garden engines.

There is a way to combine the advantages of four strokes of the piston with the advantage of one revolution of the crankshaft per cycle and that is to split the piston into an inner part which closes one end of the combustion chamber and a separable outer part which is connected to the crankshaft, and to provide means to move the inner piston part independently of the outer piston part during exhaust and intake. This provides for the inner piston part to operate on the four-stroke principle during a single revolution of the crankshaft.

U.S. Pat. No. 857,410 discloses that a quarter revolution of meshed gearing can be used to operate the piston parts in their different cycles. This design has many problems such as gnashing of teeth when the two gears engage on each revolution of the drive shaft, and a complicated gearing system that is fixed at a four to one ratio that divides the four strokes in equal lengths and periods.

U.S. Pat. No. 1,413,541 discloses a split piston having a four stroke inner piston part and a two stroke outer piston part (per cycle or engine revolution). There is also provided an inner piston part that has a cycle with a period for each stroke that is exactly 90 degrees and equal to half the period of a stroke of the outer piston which is 180 degrees. Another limitation of the apparatus includes equal stroke lengths or piston travel for the four strokes of the inner piston part.

U.S. Pat. Nos. 857,410 and 1,413,541 each disclose drive connections for the part of the piston that closes the combustion chamber so that it must move in four equal strokes, each completed during a quarter turn (90 degrees).

U.S. Pat. No. 1,582,890 discloses two pistons in a cylinder, which close two chambers. Operating not on a four stroke principle, it uses a cam actuation means to move the inner piston between the two chambers and two sets of ports generally located at opposite ends of its stroke along the cylinder wall. This is to allow the inner piston to pressurize the outer chamber on its downward stroke, which takes a lot of power and strength requiring its actuating apparatus to be unnecessarily heavy and bulky in structure. Furthermore, the outer ports on the cylinder wall limit the inner piston to equal stroke lengths and symmetrical periods. This patent teaches cylinder ports which the inner piston must cover during combustion and final compression of the combined charges from both cylinder chambers, so that these two strokes are limited to equal lengths and shaft turns.

U.S. Pat. No. 5,243,938, incorporated by reference herein, discloses a differential stroke piston apparatus for reciprocating internal combustion engines having a piston means disposed within a cylinder including an inner piston part which closes and seals the cylinder chamber and an outer piston part which serves as a carrier for the inner piston part and is connected to the engine shaft, preferably a crankshaft. The inner piston part is effective to operate on a cycle different from that of the outer piston, for example four strokes for the inner piston part and two strokes for the outer piston part per revolution of the engine.

There is a need in the art for an improved differential stroke piston apparatus.

OBJECT OF THE INVENTION

It is an object of the present invention to overcome or ameliorate at least one of the disadvantages of the prior art, or to provide a useful alternative.

It is an object of the invention in its preferred form to provide an improved differential stroke piston apparatus.

SUMMARY OF THE INVENTION

According to an aspect of the invention there is provided a piston apparatus for a differential stroke combustion engine, the combustion engine including one or more two-part pistons, each two-part piston having a first piston part and a second piston part, the apparatus comprising:
  piston-lever element mechanically coupled to the second piston part;
  a plurality of cam-follower assemblies selectively coupleable with the piston-lever element for controlling operation of the second piston part; and
  wherein selective engagement and disengagement of the one or more cam-follower assemblies defines an operational mode of the second piston part.

Preferably, the piston-lever element forms a four-bar linkage with a piston rocker link element, one or more force link bars, and one or more fulcrum link bars.

The apparatus preferably comprises a piston-train shaft that pivotally supports the assembly with respect to an engine block. More preferably, the piston-train shaft is coupled to the rocker link element and the one or more fulcrum link bars. Most preferably, the piston-train shaft fixes a pivot point of the four-bar linkage, with respect to an engine block.

The cam-follower assemblies preferably comprise a piston cam shaft. Preferably, the piston cam shaft is pivotally supported on an engine block. More preferably, the cam shaft comprised a plurality of cam lobes. Most preferably, the cam-follower assemblies further comprises a respective plurality of piston rocker-fingers for camming engagement with the cam lobes, wherein each piston rocker-fingers is selectively coupleable to the piston-lever element. Selectively coupling the piston rocker-fingers to the piston-lever is preferably achieved by a selectively-retractable piston rocker-finger pin—which when extended engages the piston rocker link.

Preferably, the piston-lever element is biased toward the second piston part being positioned in an upward disabled configuration, being away from movement of the first piston part. More preferably, the bias is provided by a compression spring assembly.

Preferably, the first piston part and the second piston part move co-axially. More preferably, movement of the piston stem is substantially limited to moving lengthwise along the cylinder axis. Most preferably, the first piston part is an outer piston part, and the second piston part is an inner piston apart.

Preferably, the apparatus has a plurality of operating modes defined by selective engagement or disengagement of one or more cam-followers assemblies. More preferably, the apparatus comprises two cam-followers assemblies for defining four operating modes. Most preferably, one operating mode effectively disables the second piston part.

According to an aspect of the invention there is provided a piston apparatus as herein disclosed.

According to an aspect of the invention there is provided a method of controlling operation of a second piston part of a differential stroke combustions engine, the method comprising the steps of:
  providing a differential-stroke cycle engine;
  engaging or disengaging one or more cam-followers for selectively enabling one of a plurality of modes of operation; and
  controlling, based on a selected mode of operation, displacement of the second piston part across an engine crank cycle.

Preferably, the differential-stroke cycle engine is as herein disclosed. More preferably, the one or more cam-followers are as herein disclosed. Most preferably, selectively engagement or disengagement of one or more cam-followers defines one of a plurality of operating modes.

According to an aspect of the invention there is provided a method of controlling operation of a second piston part of a differential stroke combustions engine, as herein disclosed.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
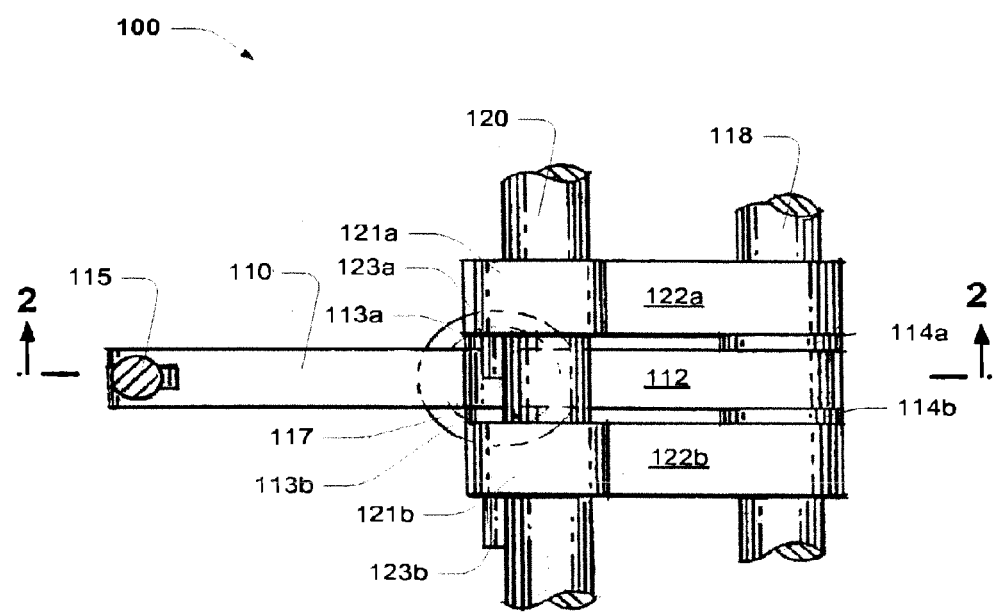
FIG. 1 is a plan view of an embodiment apparatus according to the invention.

A differential-stroke cycle engine employs a two-part piston to complete the four-stroke thermal cycle in every engine revolution. The two-part piston comprises an outer piston part and an inner piston part. Preferably, an outer piston part and an inner piston part move co-axially.

It will be appreciated that, conventional piston engines (two-cycle or four-cycle), use a piston to perform two functions. Those functions are to seal the chamber and to transmit forces between the chamber and the crankshaft. An alternative is to separate these two functions using a two-part piston, consists of an inner piston part and an outer piston part, as used in a differential-stroke cycle (D-cycle) engine.

The inner piston part seals the chamber and acts as an air pump to assist gases in and out of the chamber in exhaust and intake strokes of the four-stroke cycle process—moving separately from the outer piston part. During light breathing strokes, the inner piston part is operated by a valve-train-like piston-train and moves separately from the outer piston part. During heavy-load strokes, of combustion or compression, the inner piston part is typically seated on and supported by the outer part. In this fashion, the inner piston part just passes the load in compression between the outer piston part and the chamber.

The displacement of the inner piston part, or the strokes of the D-cycle, can be shortened from the full crank-arm strokes.

It will be appreciated that—in the case of a power stroke—the lower portion of the crank stroke is inefficient in generating power. The combustion pressure drops rapidly as the piston stroke descends about seven degrees aTDC (after Top Dead Center), and the crank torque arm shortens after ninety degrees aTDC. The lower $\frac{1}{3}$ of power stroke generates less than about $\frac{1}{9}$ of total output power, while contributing to about $\frac{1}{3}$ of piston-ring friction (a major portion of piston loses). In part load operations, stroking the lower cylinder volume can waste more power than it gains.

Moreover, the D-cycle engine can produce twice as many power strokes per revolution. Engine efficiency can be improved by not using the lower portion of the cylinders for power strokes, without substantial loss of power generation capacity of the engine structure—except in peak load.

It will be appreciated that—in the case of an intake stroke—the engine produces part load in nearly all operations (driving conditions). Shortening the intake reduces the intake throttling and frictional loses, enhancing efficiency most of the time. When occasional peak-load operation is needed, supercharging with denser gases can "regain lost cylinder volume".

A piston-cylinder set is also relatively inefficient in low-pressure compression, but is relatively efficient in high pressure compression. Charging by an external low-pressure compressor can improve efficiency. The charging of air can be inter-cooled before entering the cylinder, further enabling gas dynamic state manipulation for knock—and homogeneously-charged compression ignition (HCCI) combustion-control.

By addition of piston-train features or structures, the D-cycle engine can also comprise more modes of engine operations for various output needs. These modes of engine operation can include higher power operation, higher efficiency operation, and cylinder deactivation operation.

In an embodiment, by using two sets of cams-and-finger-followers it is disclosed that four different modes of engine operations can be affected. Each of the sets can be activated or de-activated to operate the piston-train, combined to provide four different modes of engine operations.

A differential stroke cycle means can be provided to vary the stroke period and/or stroke length of the inner piston part cycle. A differential-four-stroke piston apparatus can include an inner piston part and an outer piston part that is connected by a connecting rod to a crankshaft during the whole cycle.

The two piston parts combine to ride on the connecting rod during the power and compression portions of the cycle, when compression forces are at their highest levels. During the exhaust and intake portions of the cycle, when compression forces are nonexistent or much lower, the inner piston part executes an inward and outward movements that are exhaust and intake respectively, independently of the outer piston part which continues to move connected to the connecting rod.

Figure 2:
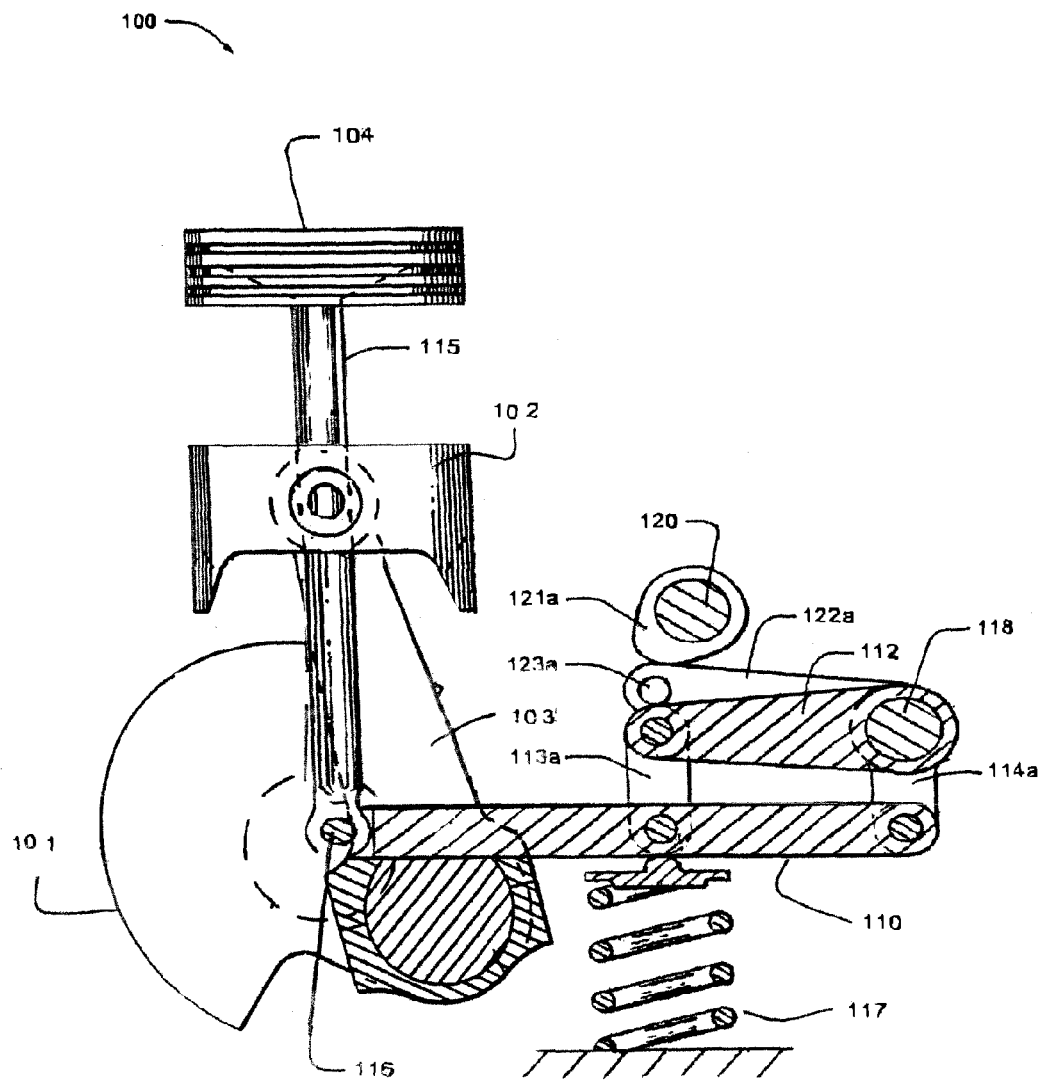
FIG. 2 is a cross-sectional of the apparatus of FIG. 1, taken along line 2-2.
Figure 3:
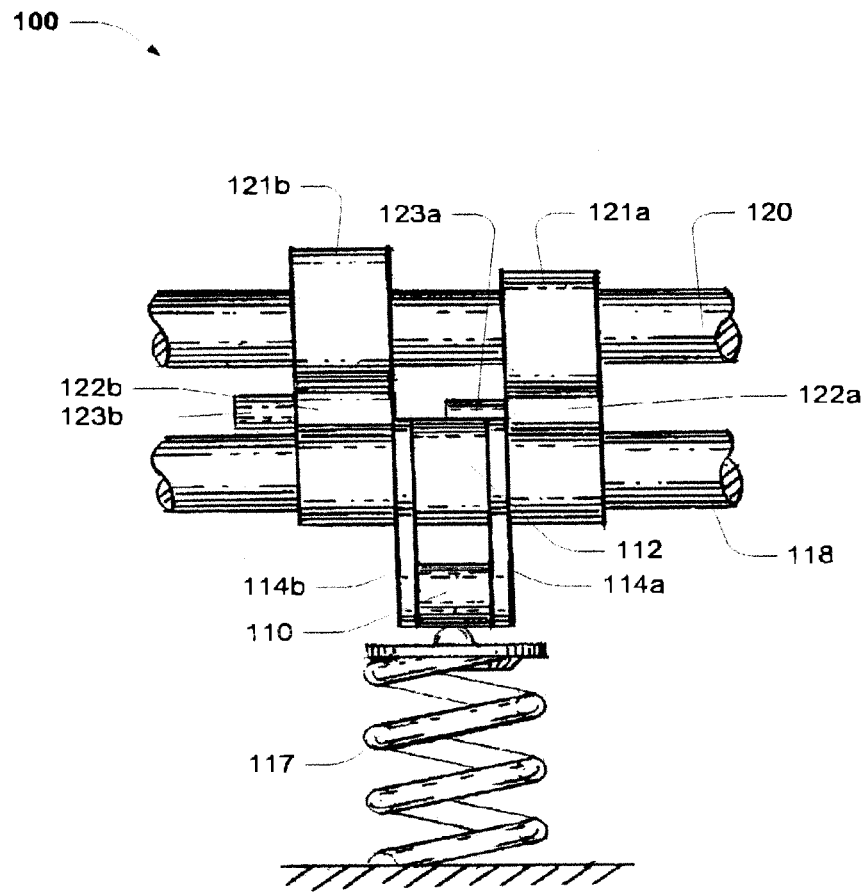
FIG. 3 is a side view of the apparatus of FIG. 1.

FIG. 1, FIG. 2, and FIG. 3 show an embodiment piston apparatus 100. This piston apparatus is for a differential stroke combustion engine, the combustion engine including one or more two-part pistons, each two-part piston having an inner piston part 104 and an outer piston part 102. The outer piston part 102 is connected to and operated by the crankshaft 101 of the engine through a connecting rod 103. The apparatus comprises:

piston-lever element mechanically coupled to the inner piston part;
a plurality of cam-follower assemblies selectively coupleable with the piston-lever element for controlling operation of inner piston part; and
wherein selective engagement and disengagement of one or more cam-follower assemblies defines an operational mode of the inner piston part.

In this embodiment, the apparatus comprises a piston-lever element 110. The piston-lever element 110 forms a four-bar linkage with a piston rocker link 112, a pair of force link bars 113a and 113b, and a pair of fulcrum link bars 114a and 114b (as best shown in FIG. 2). The piston-lever element 110 is pivotally connected at one end (being the cylinder axis end) to a piston stem 115 by a piston stem pin 116.

It will be appreciated that, the piston stem 115 is connected at the end opposite the stem pin (the stem inner end) to the inner piston part (not shown) and the operational movement of the stem is restricted to be substantially lengthwise along the cylinder axis.

In an embodiment, the piston-train apparatus is pivotally supported on a piston-train shaft 118 and biased upward (or loaded) in compression by a piston spring system 117. The piston-train shaft 118 is supported by the engine block (not shown). The piston spring system typically includes a compression spring.

In an embodiment, a plurality of cam-follower assemblies comprise a piston cam shaft 120 for controlling operation of inner piston, via the lever element 110 and the piston stem 115. The piston cam shaft 120 is supported on the engine block (not shown).

In this embodiment, that piston cam shaft 120 comprises a plurality of piston cam lobes 121a and 121b. A respective plurality of piston rocker-fingers 122a and 122b are pivotally supported on the piston-train shaft 118. These rocker-fingers 122a and 122b are biased, typically via a spring, (not shown) into bearing contact with the respective piston cam lobes 121a and 121b. Each piston rocker-finger 122a or 122b, further comprises a respective selectively-retractable piston rocker-finger pin 123a or 123b.

In use, with a piston rocker-finger pin 123a in an extended position (as best shown in FIGS. 1 and 3), rotation of piston cam lobe 121a applies bearing pressure to the rocker-finger 122a, which causes the piston rocker-finger pin 123a to apply bearing pressure to the piston rocker link 112, thereby controlling and operating the piston-train assembly. When a piston rocker pin is in the retracted position (as best shown by 123b in FIGS. 1 and 3), the piston cam is operatively disengaged from the piston-train and does not apply control over the inner piston.

Figure 4:
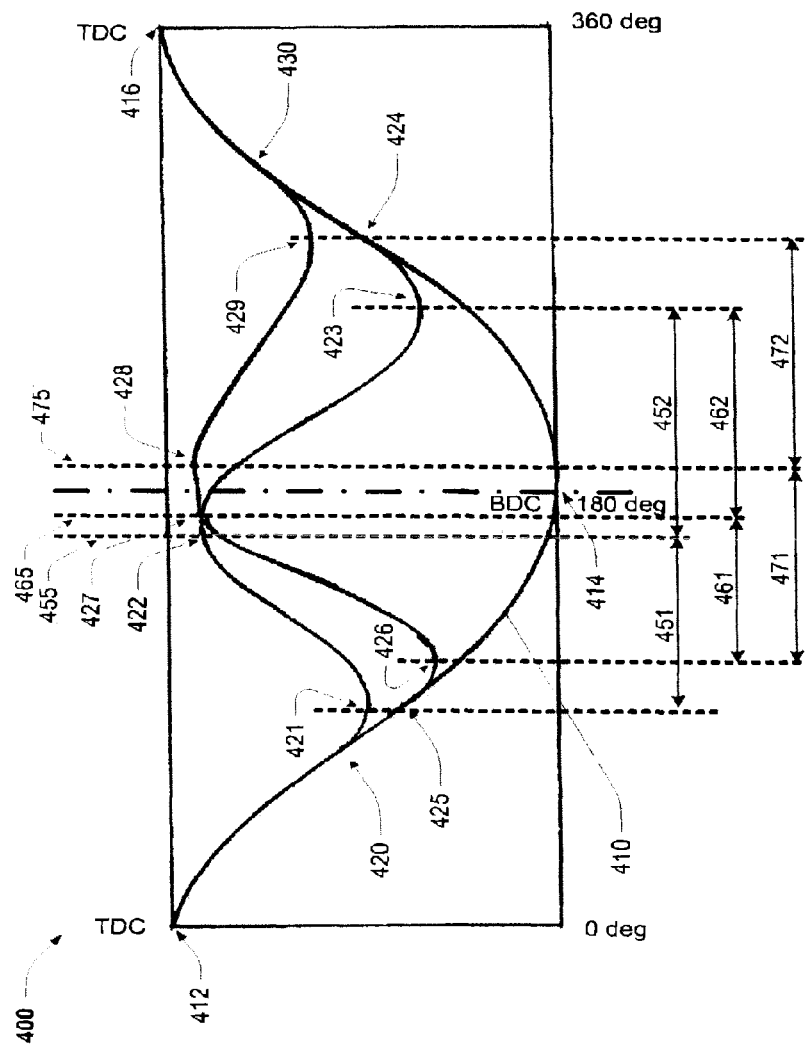
FIG. 4 is a schematic representation of four different engine operational modes of the apparatus of FIG. 1.

FIG. 4 shows a schematic representation of four different engine operational modes of an embodiment. The curves depict displacement of the inner piston part with respect to an engine crank cycle from 0 degree (top dead center, TDC), passing through 180 degrees (bottom dead center, BDC), and returning to 360 degrees (TDC).

The curve 410 (lower curve) depicts the motion of the outer piston part in an engine crank cycle, shown starting from TDC 412 at 0 degrees, passing through BDC 414 at 180 degrees, and returning to TDC 416 at 360 degrees. It will be appreciated that this motion is controlled by the crankshaft via the connecting-rod, as in the conventional manner.

By selecting combinations of engaging or disengaging (extending or retracting) the two piston rocker-finger pins 123a and 123b, the inner piston part can be selectively controlled to comply with four different curves (or modes) thereby determining motion of the inner piston part over an engine crank cycle.

By way of example only, the traces depicting the motion of an inner piston part in an engine crank cycle can be defined as:
TRACE-A: can comprise points 412, 420, 421, 422, 427, 423, 424, and returning to 416;
TRACE-B: can comprise points 412, 425, 426, 427, 428, 429, 430, and returning to 416;
TRACE-C: can comprise points 412, 425, 426, 427, 423, 424, and returning to 416; and
TRACE-D: Deactivated cylinder from stroke operations, comprising points 412 straight to 416.

By way of example only, piston cam lobe 121a can be adapted to operate the inner piston to follow TRACE-A (comprising points 412, 420, 421, 422, 427, 423, 424, and 416). This enables the inner piston to have the durations and associated displacements of the exhaust and intake strokes in the crank cycle as indicated by time periods 451 and 452 respectively. The eTDC-A (exhaust stroke TDC of TRACE-A) at crank angle line 455 which separates the exhaust stroke and the intake stroke of the differential-stroke cycle shifts forward bBDC (before Bottom Dead Center). The displacement at 422 on crank angle line 455 can determine the amount of internal EGR (exhaust gas recirculation) to assist and enhance the EGR for NOx control in this operation. It will be appreciated that this operational cycle is activated by extending the rocker-finger pin 123a operatively associated with the rocker-finger 122a, as previously discussed.

By way of example only, piston cam lobe 121b can be adapted to operate the inner piston to follow TRACE-B (comprising points 412, 425, 426, 427, 428, 429, 430 and 416). This enables the inner piston to have the durations and associated displacements of exhaust and intake strokes in the crank cycle as indicated by time periods 461 and 462 respectively. The eTDC-B (exhaust stroke TDC of TRACE-B) at crank angle line 475 which separates the exhaust stroke and the intake stroke of the differential-stroke cycle shifts backward aBDC (after BDC). This operation cycle can be activated by extending the rocker-finger pin 123b operatively associated with the rocker-finger 122b. It is noted that FIGS. 1 through 3 show the rocker-finger pin 123b to be deactivated. The displacement at 428 on crank angle line 475 determines the amount of internal EGR (exhaust gas recirculation) to assist and enhance the EGR system for NOx control in this operation.

By way of example only, piston cam lobe 121a and 121b can be adapted to operate the inner piston to follow TRACE-C (comprising points 412, 425, 426, 427, 423, 424 and 416). For developing this trace, both the piston rocker-finger pins 123a and 123b are in the extended positions, whereby the inner piston will follow the path control jointly by both cams. This is to cause the inner piston part controlled and operated by the piston cam 121*b* to follow the trace from the TDC 412 to points 425, 426, 427. At point 427 the piston cam 121*a* would take over and cause the inner piston to follow 427, 423, 424 and returning to the TDC 416. This would enable the inner piston part to have the durations and associated displacements exhaust and intake stroke in the crank cycle as indicated by 461 and 462 respectively. The eTDC-C (exhaust stroke TDC of TRACE-C) on crank angle line 465 which separates the exhaust stroke and the intake stroke of the differential-stroke cycle shifts forward bBDC. The displacement at 427 on crank angle line 465 determines the amount of internal EGR (exhaust gas recirculation) to assist and enhance the EGR system for NOx control in this operation.

It will be appreciated that, with both of the piston rocker-finger pins 123*a* and 123*b* in a retracted position, the piston spring system would bias the inner piston part to the TDC thereby deactivating a cylinder from stroke operations. An advantage of this cylinder management system, over typical four-cycle engines, is that the inner piston part does note stroke the full displacement thereby reducing loses caused by friction and pumping.

It will be appreciated that associated valve events (not shown) are necessary to accommodate the disclosed piston events for enabling exhaust and intake events to achieve optimal cylinder scavenging and filling. This can, for example, be achieved using variable valve-train (VVT) technology or another suitable means.

Figure 5:
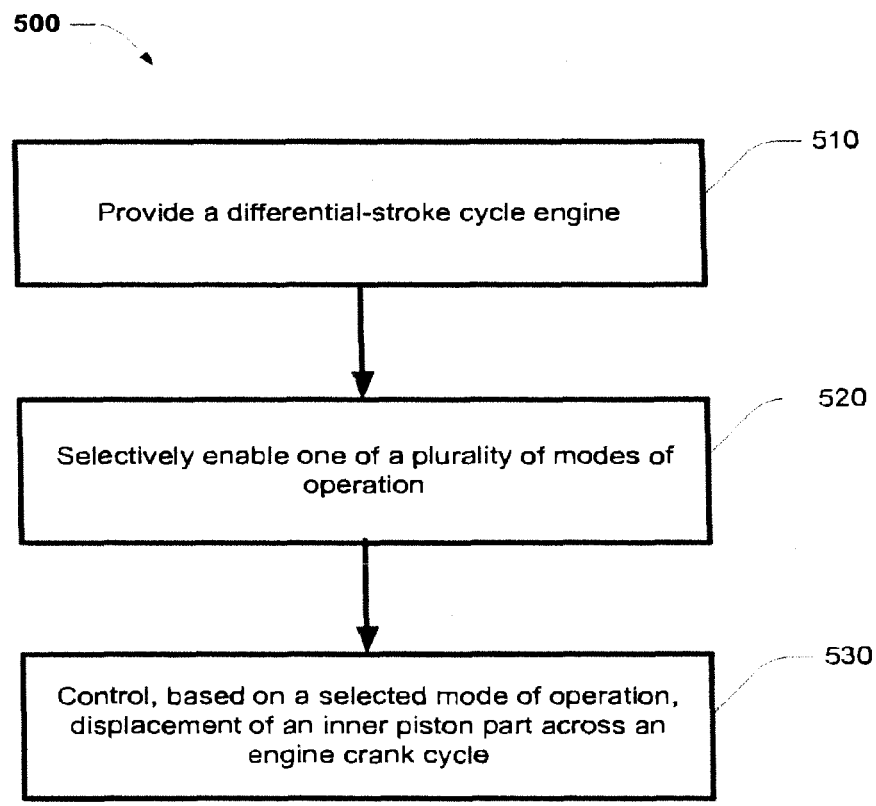
FIG. 5 is a flowchart for an embodiment method according to the invention.

FIG. 5 shows a flowchart for a method 500 of controlling operation of an inner piston part of a differential stroke combustions engine. The method comprises the steps of:

STEP 510: providing a differential-stroke cycle engine;
STEP 520: selectively enabling one of a plurality of modes of operation; and
STEP 530: controlling, based on a selected mode of operation, displacement of the inner piston part across an engine crank cycle.

By way of example only, selectively enabling one of a plurality of modes of operation can include engaging one or more cam-followers, and/or disengage one or more other cam-followers.

In this embodiment method the differential-stroke cycle engine can be as herein disclosed, the one or more piston cam-followers can be as herein disclosed, and the one or more piston cam-followers can define one of a plurality of available operating modes.

It will be appreciated that the disclosed embodiments provides an improved differential stroke piston apparatus and method.

It will be appreciated that a typical conventional engine provides peak efficiency at a specific operating point, as defined by the engine design, which is typically proximal to peak torque production and far below the rated rpm. Because there is a perceived need to keep sufficient peak-power reserve, most automotive engines are over-powered and operate far below optimal efficiency—typically utilizing less than 20% of the input energy.

While, high peak power reserve is often considered highly desirable by drivers, "because it will be available just in case", a study by MIT have indicated that about 50% of fuel can be saved (i.e. a 100% gain in mile per gallon) if the typical US automotive engines can be driven at optimal efficiency all the time.

One way to improve the efficiency is to adapt an engine's operational sweet-spot to the driving needs—while keeping the peak-power reserve. A differential-stroke cycle engine typically accomplishes this by shortening (or down-sizing) the engine to the driving needs. This differential-stroke cycle engine improvement is accomplished by a single-cam system. The sweet-spot is adapted to accommodate the "averaged" engine operations, or the "averaged" driving needs.

However, the driving needs (or engine operations) comprise a wide range of rpm and output. In city driving, for example, the engine often starts from idle and accelerates to city speed. This requires high engine torque at low rpm. During the highway cruise, the engine should operate with optimal efficiency at higher rpm. Also during the highway driving, there are times the engine needs high output at high rpm to pass the traffic. Still higher output may be needed if the vehicle is heavily loaded. With extremely light load such as in idle and in auxiliary power generation in heavy duty trucks, some of the cylinders can be deactivated to save even more fuel. It will be beneficial if the engine can adapt the sweet-spot—changing sizes—to those diversified needs.

It will be appreciated that disclosed embodiments can have four modes of engine operations. The engine sweet-spot can be optimized for respective output performance, thereby further enhance differential-stroke cycle engine advantages. It should be noted that even more additional modes of operation (sweet-spots) can be achieved with other piston-train designs.

The disclosed improved differential-stroke cycle engine is a relatively simple and inexpensive piston-train arrangement for performing various engine functions. The additional cost of implementation of the piston cam-and-follower sets is relatively minimal. The multi-mode operation can distinguish a next generation of differential-stroke cycle engines.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A piston apparatus for a differential stroke combustion engine, the combustion engine including one or more two-part pistons, each two-part piston having a first piston part and a second piston part operating on different cycles, the piston apparatus comprising:
a piston-lever element mechanically coupled to the second piston part; and
a plurality of cam-follower assemblies for controlling operation of said second piston part comprising:
a plurality of piston cam lobes;
a plurality of pivotally mounted rocker-fingers for camming engagement with the cam lobes; and
selectively-retractable and extendable rocker-finger pins;
wherein the cam-follower assemblies are selectively coupleable with the piston-lever element for controlling operation of the second piston part.

2. The apparatus according to claim 1, wherein the piston-lever element forms a four-bar linkage with a piston rocker link element, one or more force link bars, and one or more fulcrum link bars.

3. The apparatus according to claim 2, further comprising a piston-train shaft that pivotally supports the apparatus with respect to an engine block.

4. The apparatus according to claim 3, wherein the piston-train shaft is coupled to the rocker link element and the one or more fulcrum link bars.

5. The apparatus according to claim 3, wherein the piston-train shaft defines a pivot point of the four-bar linkage.

6. The apparatus according to claim 1, wherein one or more of the plurality of cam-follower assemblies comprise a piston cam shaft.

7. The apparatus according to claim 6, wherein the piston cam shaft comprises a plurality of cam lobes.

8. The apparatus according to claim 1, wherein the piston-lever element is biased by a compression spring assembly toward the second piston part being positioned to an inward configuration against the cam lobes of the cam follower assemblies.

9. The apparatus according to claim 1, wherein the first piston part is an outer piston part, and the second piston part is an inner piston apart.

10. The apparatus according to claim 1, wherein the first piston part and the second piston part move co-axially.

11. The apparatus according to claim 10, wherein the piston-lever element is pivotally connected at one end to a piston stem and movement of the piston stem is substantially limited to moving lengthwise along a piston cylinder axis.

12. The apparatus according to claim 1, wherein the apparatus has a plurality of operating modes defined by selective engagement or disengagement of one or more cam-followers assemblies.

13. The apparatus according to claim 1, wherein the apparatus comprises two cam-followers assemblies for defining four operating modes.

14. The apparatus according to claim 13, wherein one of the four operating modes effectively disables operation of the second piston part.

15. A method of controlling operation of a second piston part of a differential stroke combustions engine, the method comprising the steps of:

providing a differential-stroke cycle engine comprising:
- a piston-lever element mechanically coupled to the second piston part;
- a plurality of cam-follower assemblies selectively coupleable with the piston-lever element comprising:
  - a plurality of cam lobes;
  - a plurality of pivotally mounted rocker-fingers for camming engagement with the cam lobes; and
  - selectively-retractable and extendable rocker-finger pins;

engaging or disengaging one or more of the plurality of cam-followers for selectively enabling one of a plurality of operation modes; and controlling, based on a selected operation mode, displacement and timing of the second piston part across an engine crank cycle.

16. The method according to claim 15, wherein selective engagement or disengagement of one or more of the plurality of cam-followers defines a respective one of the plurality of operating modes.

17. A piston-train apparatus for a differential stroke engine, the engine including one or more two-part pistons, each two-part piston having a first piston part and a second piston part having a piston stem extending through said first piston part, the apparatus comprising:
- a piston-lever element pivotally connected at one end to a piston stem of the second piston part and forming a four-bar linkage pivotally supported on a piston-train shaft;
- a piston cam shaft having one or more piston cam lobes;
- a plurality of rocker-fingers pivotally supported on the piston-train shaft; and
- selectively-retractable piston rocker-finger pins in each of the plurality of rocker-fingers,
- wherein the rocker-finger pins, in an extended position, apply bearing pressure to the four-bar linkage, thereby controlling and operating the second piston part.

18. The apparatus of claim 17, wherein the rocker-finger pins, in a retracted position, operatively disengage the piston-train apparatus from the second piston part.

19. The apparatus of claim 17, wherein the piston-lever element forms a four-bar linkage comprising a piston rocker link, a pair of force link bars, and a pair of fulcrum link bars.

20. The apparatus of claim 17, wherein the plurality of rocker-fingers are biased into bearing contact with respective piston cam lobes.

* * * * *